United States Patent [19]

Jones

[11] Patent Number: 4,509,626
[45] Date of Patent: Apr. 9, 1985

[54] HYDRAULICALLY ACTUATED HIGH TORQUE, QUICK ENGAGEMENT CLUTCH ASSEMBLY

[75] Inventor: Donald D. Jones, Elwood, Ill.

[73] Assignee: Elwood Manufacturing Company, Elwood, Ill.

[21] Appl. No.: 382,478

[22] Filed: May 27, 1982

[51] Int. Cl.³ .......................................... F16D 25/063
[52] U.S. Cl. .................................... 192/85 AA; 74/13; 180/233
[58] Field of Search ................. 192/85 A, 85 AA; 180/53 CD, 248, 233; 74/13, 14

[56] References Cited

U.S. PATENT DOCUMENTS

| | | | |
|---|---|---|---|
| 2,702,619 | 2/1955 | Andershock | 192/85 AA |
| 2,876,881 | 3/1959 | Parrett | 192/85 AA |
| 3,213,984 | 10/1965 | Cook | 192/85 AA |
| 3,285,379 | 11/1966 | Helquist | 192/85 AA |
| 4,036,344 | 7/1977 | Nolan | 192/85 AA |
| 4,090,597 | 5/1978 | Folomin et al. | 192/85 AA |

FOREIGN PATENT DOCUMENTS 645812  7/1962  Canada ........................ 192/85 AA Primary Examiner—Rodney H. Bonck
Attorney, Agent, or Firm—John L. Parker

[57] ABSTRACT

A friction-type clutch assembly is provided for connecting full-speed power to a dead load, including an output shaft assembly including axially spaced, annular separator plates extending outwardly from and slidably secured along their inner circumference directly to an output shaft hub, a drive gear assembly including axially spaced, annular friction plates extending inwardly from and slidably secured along their outer circumference directly to an outer carrier member, with the annular friction plates of the drive gear assembly interposed between the annular separator plates of the output shaft assembly so that lateral motion of the respective plates toward one another causes clutching action of the drive gear and output shaft, and a piston and cylinder arrangement for drivingly connecting the drive gear assembly to the output shaft assembly, including an annular piston rotatably mounted on the output shaft and interposed between the drive gear and the output shaft hub, with the outer piston face being annular and disposed to directly engage the innermost one of the separator plates when the clutch is actuated without any intervening element therebetween, a coil spring for normally maintaining the piston disengaged from the innermost separator plate, with the coil spring surrounding the output shaft and disposed within a recess within the piston, and with the inner piston face cooperating with the outer face of the drive gear to define therebetween a chamber for hydraulic fluid under pressure.

7 Claims, 8 Drawing Figures

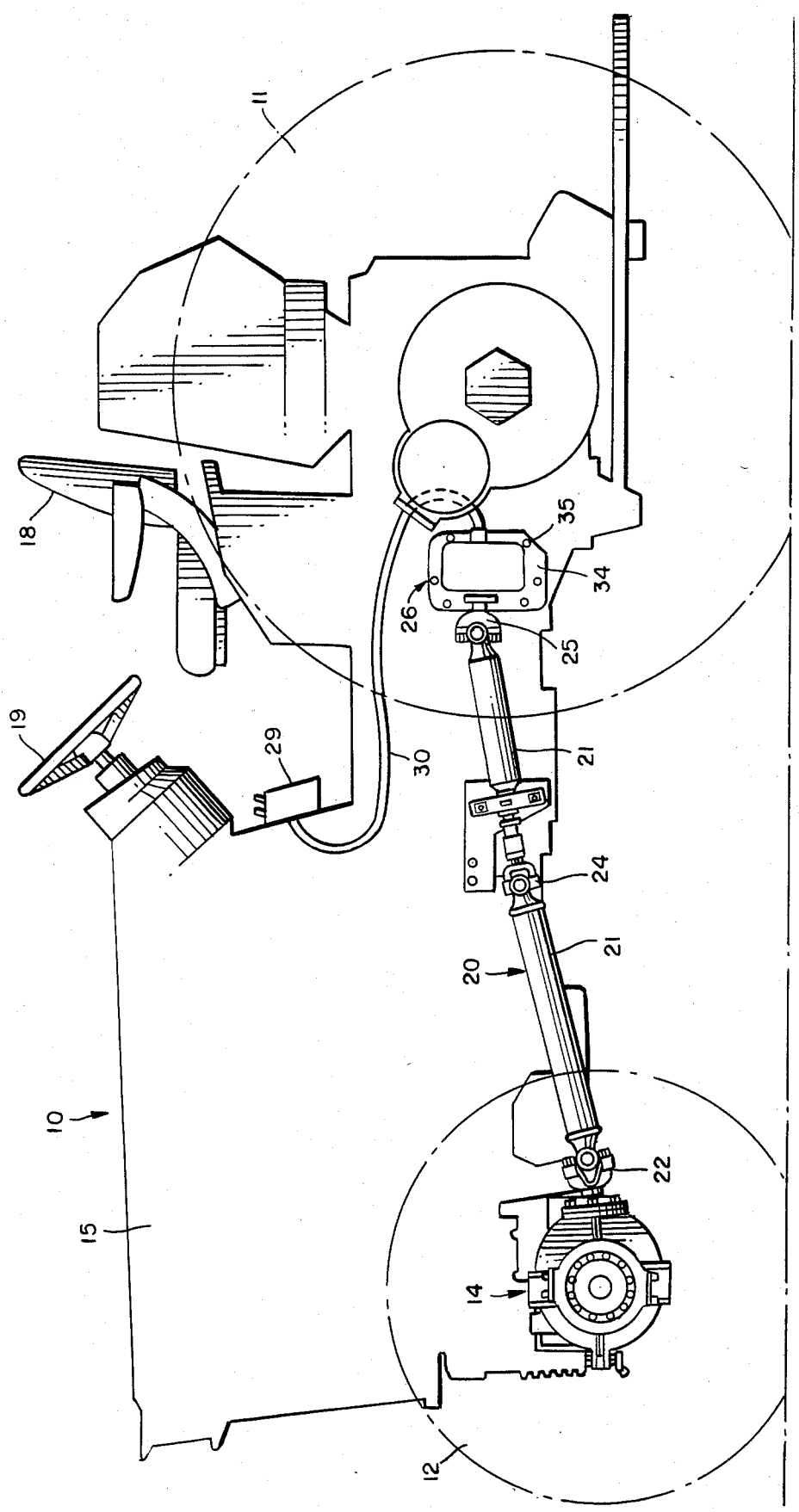

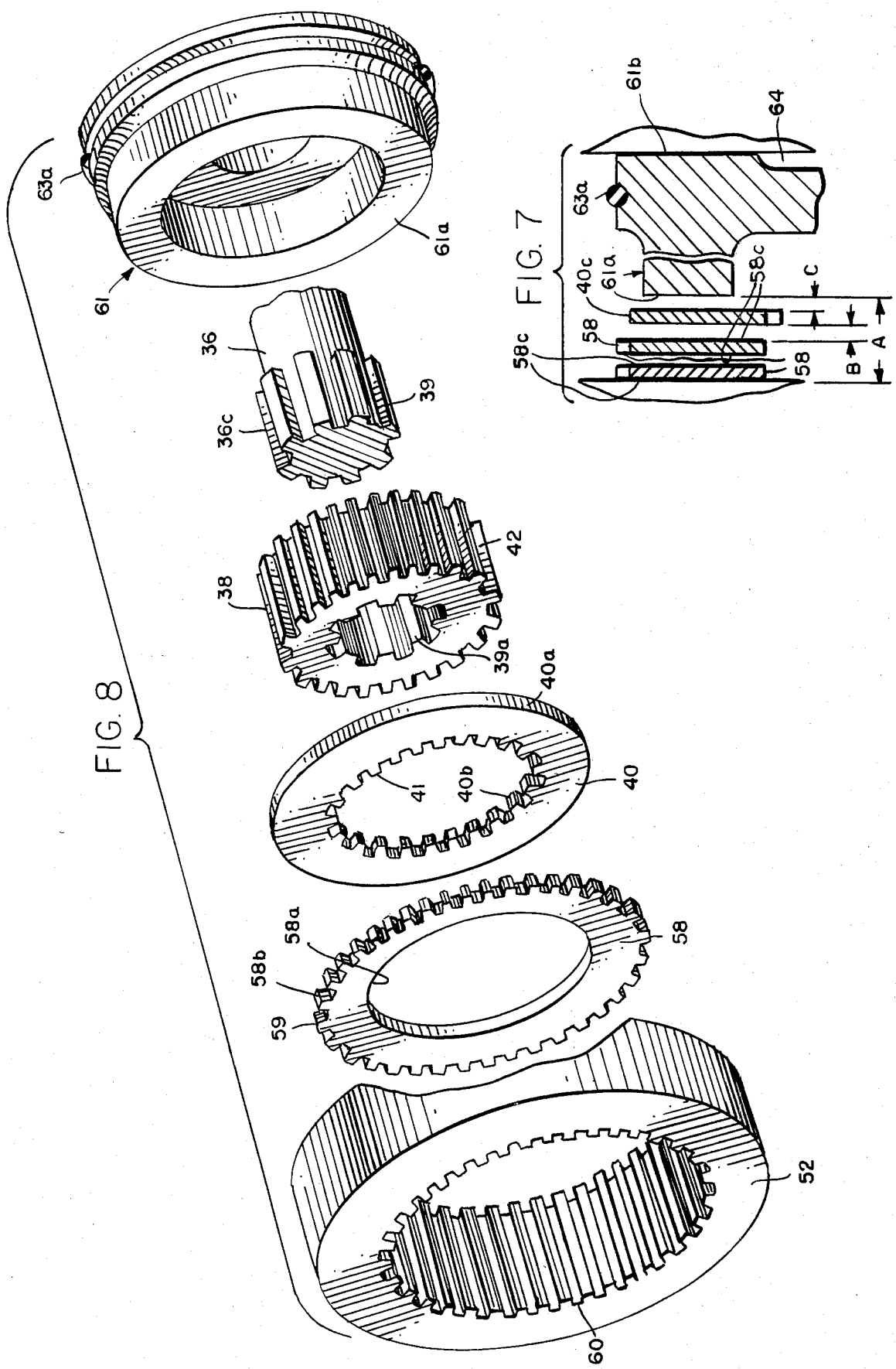

HYDRAULICALLY ACTUATED HIGH TORQUE, QUICK ENGAGEMENT CLUTCH ASSEMBLY

BACKGROUND AND OBJECTS OF THE INVENTION

This invention relates to a multi-purpose clutch assembly for connecting full-speed power to dead load, and more particularly, to such a clutch assembly of the friction-type which may be used to connect power to virtually any load to be driven. The invention is especially suitable for transmitting power from the power-take-off of a two-wheel drive vehicle to an auxiliary drive axle for the vehicle to thereby convert the two-wheel drive vehicle to all-wheel drive.

The clutch assembly of the invention is capable of use in a wide variety of applications where power delivery to an outside demand is required, such as industrial, materials handling, agricultural, marine and transportation applications. Typical applications in addition to transmitting power from the power-take-off of a two-wheel drive vehicle to an auxiliary drive axle for the vehicle include use as a drive unit to creep drive a ditch digging machine, and as a drive unit to drive a high volume, high torque hydraulic pump.

For some years, drive attachments have been available for converting two-wheel drive vehicles to four-wheel drive, especially for use with tractors. Such drive attachments have commonly taken the form of a conversion unit for use with a conventional farm tractor having only two-wheel drive. An example of such a conversion unit may be found in U.S. Pat. No. 2,855,063 to Steinke and Erickson. Such drive attachments enable a two-wheel drive tractor, for instance, to be converted to four-wheel drive which is particularly advantageous for certain ground traction and planting conditions encountered in farming.

One of the disadvantages of conventional drive attachments for such applications is that the vehicle must be at a standstill in order to shift it from two-wheel to four-wheel drive. Yet, it is often desirable for a farmer or other vehicle driver to be able to shift from two-wheel drive to four-wheel drive, and vice versa, instantly while the tractor is in motion. For example, sometimes an abrupt change in farming soil or road conditions makes it desirable for the farmer to be able to quickly shift from two to four-wheel drive without having to stop the tractor.

A primary object of the invention is to provide a clutch assembly for quickly shifting a vehicle from two-wheel to four-wheel drive, which provides quick and positive clutching action at fingertip control of the driver of the vehicle. An allied object of the invention is to provide such a clutch assembly which provides "on-the-go" engagement of all-wheel drive for the vehicle when desired, so that the driver may engage the clutch while the vehicle is in motion to cause the auxiliary wheels to begin pulling immediately. Still another object of the invention is to provide such a clutch assembly which enables the vehicle, when engaged in all-wheel drive, to move quickly and securely on wet or other poor traction type soils.

An allied object of the invention is to provide such a clutch assembly which transmits high torque from the power-take-off of the vehicle to an auxiliary drive axle for the vehicle to thereby provide better vehicle wheel traction and increased vehicle pulling power. Another object of the invention is to provide such a clutch assembly which is fuel efficient, increases vehicle tire wear, and extends the vehicle life beyond that of conventional clutches.

Another object of the invention is to provide a clutch assembly which is compact and light in weight, yet which is capable of transmitting high-power loads from the main drive of a vehicle to the auxiliary wheels in just a fraction of a second. An allied object is to provide such a clutch assembly which, when the vehicle is engaged in all-wheel drive, lends assurance that each of the vehicle wheels maintains drive at all times. Still another object of the invention is to provide such a clutch assembly which may be compactly secured to a vehicle such as a tractor so as to provide sufficient mid-tractor clearance that the tractor may be operated over rough terrain without damaging the auxiliary wheel driveline. Still another object of the invention is to provide such a clutch assembly as a totally sealed unit, eliminating conventional maintenance requirements.

Certain preferred structures in accordance with the invention have been described and illustrated. It will be apparent to those skilled in the art that various changes and modifications may be made therein within the spirit and scope of the invention. It is intended that such changes and modifications be included within the scope of the appended claims.

BRIEF DESCRIPTION OF THE DRAWINGS

The foregoing and other objects, advantages and functions of the invention will be apparent on reference to the specification and to the attached drawings illustrating a preferred embodiment of the invention, in which drawings like reference symbols are applied to like parts in each of the views, and in which:

FIG. 1 is an elevational view of an illustrative vehicle (shown in outline) for use in demonstrating the invention, showing in this instance a farm tractor equipped with the clutch assembly of the invention and associated control means for selectively engaging or disengaging a front auxiliary two-wheel drive axle.

FIG. 7 is an expanded, vertical cross-sectional view illustrating the spatial relationship between certain of the internal parts of the illustrative clutch assembly.

FIG. 8 is an enlarged fragmentary, perspective, exploded view of the internal parts shown in FIGS. 5 and 6, showing the manner in which certain of the internal clutch parts are arranged within the clutch assembly.

DESCRIPTION OF THE PREFERRED EMBODIMENT

Figure 4:
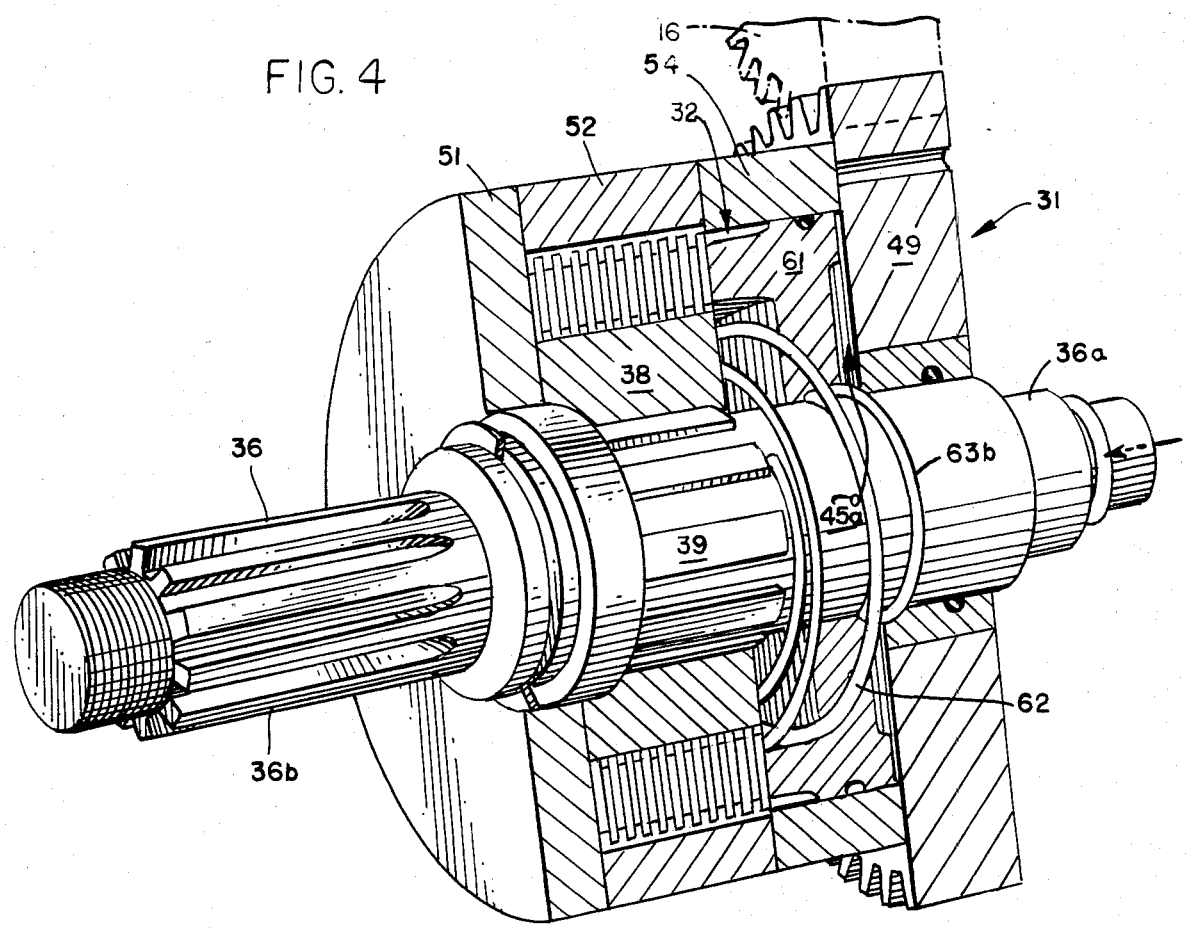
FIG. 4 is a fragmentary perspective view, partly cut-a-way and partly in section, of the illustrative clutch assembly used in carrying out the invention.
Figure 5:
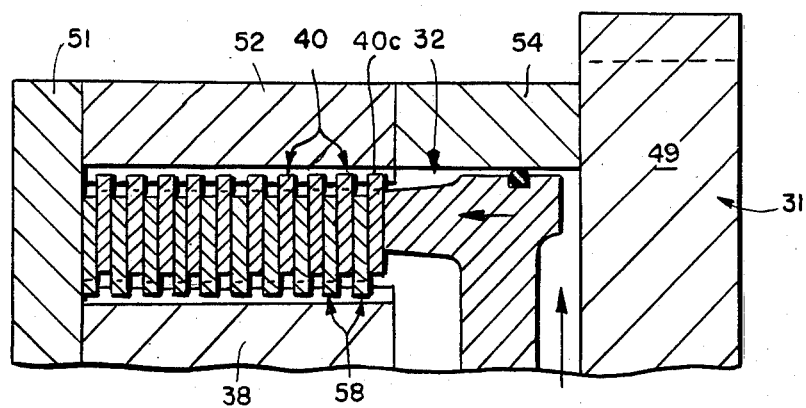
FIGS. 5 and 6 are enlarged, fragmentary, vertical cross-sectional views showing the internal structure of the illustrative clutch assembly, with the clutch in engaged (FIG. 5) and disengaged (FIG. 6) positions.
Figure 6:
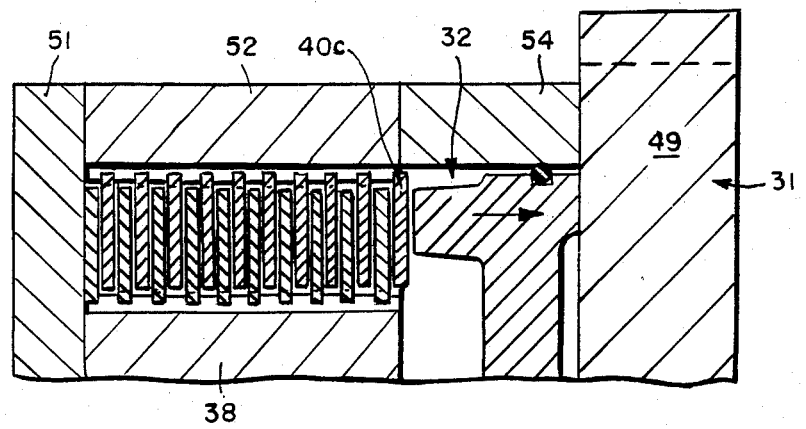

Referring to the drawings, a preferred embodiment of the invention is illustrated in conjunction with an illustrative tractor 10 having conventional rear wheels 11 which are normally driven, and front wheels 12 mounted on an auxiliary two-wheel drive axle assembly 14. The auxiliary front wheels 12 are not normally driven when the vehicle is moving, but may be drivingly engaged as desired as explained below. The tractor includes a hood enclosed engine 15 of conventional design and a power transmission unit (not shown) for conveying engine power to its rear wheels 11, which are continuously driven when the vehicle is moving. The power transmission unit of the tractor includes a power-take-off gear wheel 16 (see FIG. 4) for supplying power to the auxiliary front wheel drive axle assembly 14 (as described below) or for any of a variety of tractor accessories.

The tractor 10 also has a conventional driver's seat 18 and steering wheel 19, and is provided with an auxiliary front wheel driveline 20 for use when four-wheel drive is desired, as explained below. The driveline 20 includes the front wheel drive axle assembly 14 and an articulated drive shaft 21 extending rearwardly along the underside of the tractor and including several yoke-type joints 22, 24, 25, to the clutch assembly 26 of the invention, mounted on the exterior of the tractor beneath the driver's seat 18. The articulated drive shaft 21 is releasably secured at its rear portion by way of the yoke 25 to an output shaft assembly 28 of the clutch assembly 26 (both assemblies described below).

For the purpose of actuating the clutch assembly 26, a suitable source of pressurized hydraulic fluid and a control box 29 is provided on the tractor near the driver's seat 18 so that the driver may shift the controls manually. Appropriate tubing 30 is provided for conveying hydraulic fluid under pressure from the hydraulic system of the tractor to the clutch assembly 26 as desired. The control box 29 includes, in this instance, an electric solenoid valve and a toggle switch (not shown).

In carrying out the invention, the clutch assembly 26 is constructed so as to provide "on-the-go" engagement of all-wheel drive when desired. That is, without stopping the tractor, the driver may engage the clutch so that the auxiliary front wheels 12 begin pulling immediately.

In the illustrative form of the invention, the clutch assembly 26 includes the output shaft assembly 28, a drive gear assembly 31, and coupling means 32 for drivingly connecting the drive gear assembly to the output shaft assembly, all disposed within a clutch casing 34 suitably mounted as by bolts 35 onto the tractor 10 adjacent to the power-take-off gear 16. In this instance, the coupling means 32 takes the form of a piston and cylinder assembly.

The output shaft assembly 28 includes an output shaft 36 having inner 36a and outer 36b ends and a mid-portion 36c, an output shaft hub 38 which is secured via splines 39 carried by the shaft and hub teeth 39a to the shaft mid-portion 36c to thereby rotate with the shaft as a unit, and a plurality of axially spaced, annular separator plates 40 extending outwardly from and slidably secured to the hub 38. The plates 40 are thus rotatable with the hub 38 and axially slidable with respect thereto.

As will be seen from FIGS. 4-6 and 8, each of the annular separator plates 40 is provided with a smooth exterior periphery 40a, but its interior periphery 40b is provided with spaced circumferential teeth 41 arranged to fit loosely between axial splines 42 provided on the outer periphery of the hub 38. In this way, the separator plates 40 are rotatably secured to the hub 38, yet the plates may slide axially along the hub in order to engage or disengage the clutch as explained further below.

The outer end 36b of the output shaft extends through an opening in one end of the casing 34 and is releasably connected to the articulated drive shaft 21 by means of the yoke joint 25. The inner end 36a of the shaft extends through an opening in the other end of the casing 34 covered by a cap 44, and is provided with an internal passageway 45 for hydraulic fluid as will be described. The fluid passage 45 extends axially within the center of the shaft end 36a and then takes the form of a diametrical passageway 45a. The ends of the shaft 36 are journaled within the casing 34 by tapered roller bearings 46, 48.

Turning now to the drive gear assembly 31, it includes a drive gear 49 having an outer face 49b and an inner face 49c. The drive gear 49 is rotatably mounted on the output shaft (see O-ring seal 49d) and drivingly connected through its gear teeth 49a to the vehicle power-take-off gear wheel 16, and an axially disposed outer friction plate carrier 50 surrounding the output shaft assembly 28 and particularly the annular separator plates 40 carried by that assembly. The outer friction plate carrier 50 includes an axially spaced backplate 51, separated from the drive gear 49 by axially aligned ring-type members constituting a clutch drive hub 52 and a piston housing 54. The drive gear 49, piston housing 54, clutch drive hub 52, and backplate 51 are secured together to rotate as a unit by means of a plurality of circumferentially spaced bolts 55 and dowel pins 56.

In keeping with the invention, the clutch drive hub 52 is provided around its inner periphery with a plurality of axially spaced, annular friction plates 58 extending inwardly from and slidably secured to the drive hub 52. The plates 58 are thus rotatable with the drive gear 49 and axially slidable with respect to the hub 52. The friction plates 58 are arranged so as to be interposed between the separator plates 40 of the output shaft assembly 28 for clutching action as will be described.

As will be seen from FIG. 8, each of the annular friction plates 58 is provided with a smooth interior periphery 58a, but its exterior periphery 58b is provided with spaced circumferential teeth 59 arranged to fit loosely between axial splines 60 provided on the inner periphery of the clutch drive hub 52. In this way, the friction plates 58 are rotatably secured to the hub 52, yet the plates may slide axially along this hub in order to engage or disengage the clutch as explained below.

In the illustrative form of the invention, the separator plates 40 are formed of steel and are about 0.08 inches thick, with outer and inner diameters of about 4.8 inches and 3.6 inches, respectively. The illustrative friction plates 58 have a steel base coated on both sides with a suitable friction surface 58c. (See FIG. 7). In the illustrative form of the invention, each friction plate 58 has an outer diameter of about 4.6 inches and an inner diameter of about 3.5 inches. The metal base of these friction plates is about 0.035 inches thick, and the thickness of the friction surface 58c (in the unworn condition) on each side of the metal base is about 0.02 inches.

It will of course be readily recognized that the friction plates 58 may be provided with any of a variety of friction surfaces 58c. For example, a suitable asbestos or specially treated paper surface may be employed on the plates 58. The thickness of the friction surface will of course depend upon the relationship between that thickness and other variables in the clutch construction. I prefer to employ friction material which exhibits a high coefficient of friction and yet has excellent resilience and oil absorbency characteristics.

Preferably, the separator plates 40 and friction plates 58 are encased in a bath of hydraulic transmission oil 57. When the clutch is disengaged, this oil is present between adjacent plates 40, 58. When the plates are compressed together during clutching action, the oil serves to cushion this action and thereby assists in providing smooth engagement and disengagement of the clutch.

As shown in the drawings, the piston and cylinder assembly 32 is interposed between the drive gear assembly 31 and the output shaft assembly 28. The piston and cylinder assembly includes a cup-shaped cylindrical piston 61 arranged within the piston housing or cylinder 54, a coil spring 62 mounted on the output shaft 36 between the piston 61 and the output shaft hub 38 for urging the piston into the disengaged position of the clutch, and means (partially shown, see 29, 30) for applying hydraulic fluid pressure to the piston to force it against the bias of the spring 62 and into engagement with the pack of overlapping clutch separator and friction plates 40, 58.

In this instance, the hydraulic piston 61 is rotatably mounted on the output shaft 36 (see O-ring seal 63b), and is thus free to more or less float within the piston cylinder 54. The piston tends, however, to rotate at generally the same speed as the piston housing 54 due to the contact therebetween provided around an O-ring type seal 63a. As indicated, the piston is laterally movable along the output shaft 36, and has its outer piston face 61a (see FIGS. 7, 8) disposed to engage the innermost one 40c of the separator plates 40 to thereby compress the entire group of overlapping plates 40, 58 to bring about clutching action. The inner face 61b of the piston is recessed (at 64) so that in cooperation with the outer face 49b of the drive gear it defines therebetween a chamber for hydraulic fluid. As will be seen, this hydraulic fluid chamber 65 communicates with the internal passageway 45, 45a provided within the output shaft 36 and which is connected to the hydraulic fluid tubing 30.

In operation, the various steps and movements of the clutch assembly of the invention are as follows. When it is desired to shift a two-wheel drive vehicle, such as a tractor, to four-wheel drive, the driver manually trips the valve (not shown) located on the hydraulic fluid control box 29 of the tractor to thereby release hydraulic fluid under pressure to the internal passageway 45, 45a provided within the output shaft 36. This pressure is in turn transmitted to the fluid chamber 65 to thereby cause the piston 61 to move outwardly away from the drive gear 49 along the output shaft 36. Piston movement continues unimpeded until the outer face 61a of the piston engages the innermost separator plate 40c carried by the drive gear assembly 31. Continued movement of the piston outwardly then compresses the sandwich of separator and friction plates 40, 58, squeezing the oil from between them and forcing them together to thereby tightly lock-up the clutch. At this point, the drive gear 49 which is rotating in unison with the power-take-off gear 16 of the tractor is drivingly connected through the clutch plates 40, 58 to the output shaft 36, and the output shaft thus rotates in unison with the drive gear. In this fully engaged clutch position, the clutch assembly transmits power from the tractor engine-take-off to the auxiliary front wheel driveline 20 and the vehicle now is fully engaged in all-wheel drive.

When the vehicle driver wishes to discontinue the auxiliary wheel drive, i.e. to shift the vehicle back to two-wheel drive, the driver trips the control box valve in the opposite direction as before, thereby releasing hydraulic fluid pressure being exerted upon the piston 61. At this point, the coil spring 62 forces the piston 61 back so that the outer piston face 61a is released from its engagement with the innermost clutch plate 40c. The piston 61 continues its movement along the output shaft 36 until its inner surface 61b abuts the drive gear face 49b. At this point, the piston is completely free of engagement with the clutch plates 40, 58, and there is no clutching engagement between them.

One of the features of the invention is that the piston 61 need travel only a fraction of an inch in order to overcome the torque necessary to turn the output shaft 36. As a result, the clutch is almost instantly locked up upon application of hydraulic fluid pressure to the piston. The force of the clutch piston 61 is exerted over a minimal distance before the piston locks up the clutch plates, and the elapsed time for the clutch piston to move from a completely disengaged position to a completely engaged position of the clutch is only a fraction of a second.

The clutch assembly of the invention provides not only an extremely quick lock-up, but does so without grabbing, i.e. smooth engagement of the clutch plates 40, 58 is facilitated by the large number of plates employed (in this instance twenty plates total, ten driving or separator plates 40, and ten driven or friction plates 58), as well as through use of the preferred hydraulic transmission oil medium 57 for the plates.

When the illustrative preferred clutch is in operation, but is disengaged, hydraulic transmission oil is present between each of the plates 40, 58, as well as between the innermost plate 40c and the outer face 61a of the piston. I have designed my clutch so that the pack of plates 40, 58 occupies virtually all of the available lateral space between the piston 61 and the backplate 51 of the drive gear assembly 31 (this available space is designated A in FIG. 7, and is about 1.5 inches in the illustrative form of the invention). In this manner, the separation distances between each plate 40 and its adjacent plate 58 (this space is designated B in FIG. 7), and between the end plate 40c and the piston face 61a (this space is designated C in FIG. 7) are very short, only about 0.01 inch.

Figure 3:
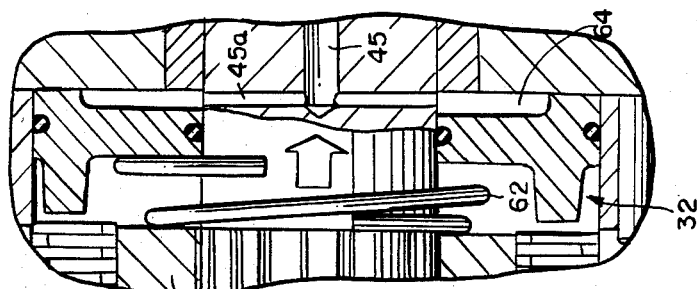
FIG. 3 is a vertical fragmentary cross-sectional view of a portion of the clutch assembly shown in FIG. 2, with the clutch shown in disengaged position.
Figure 2:
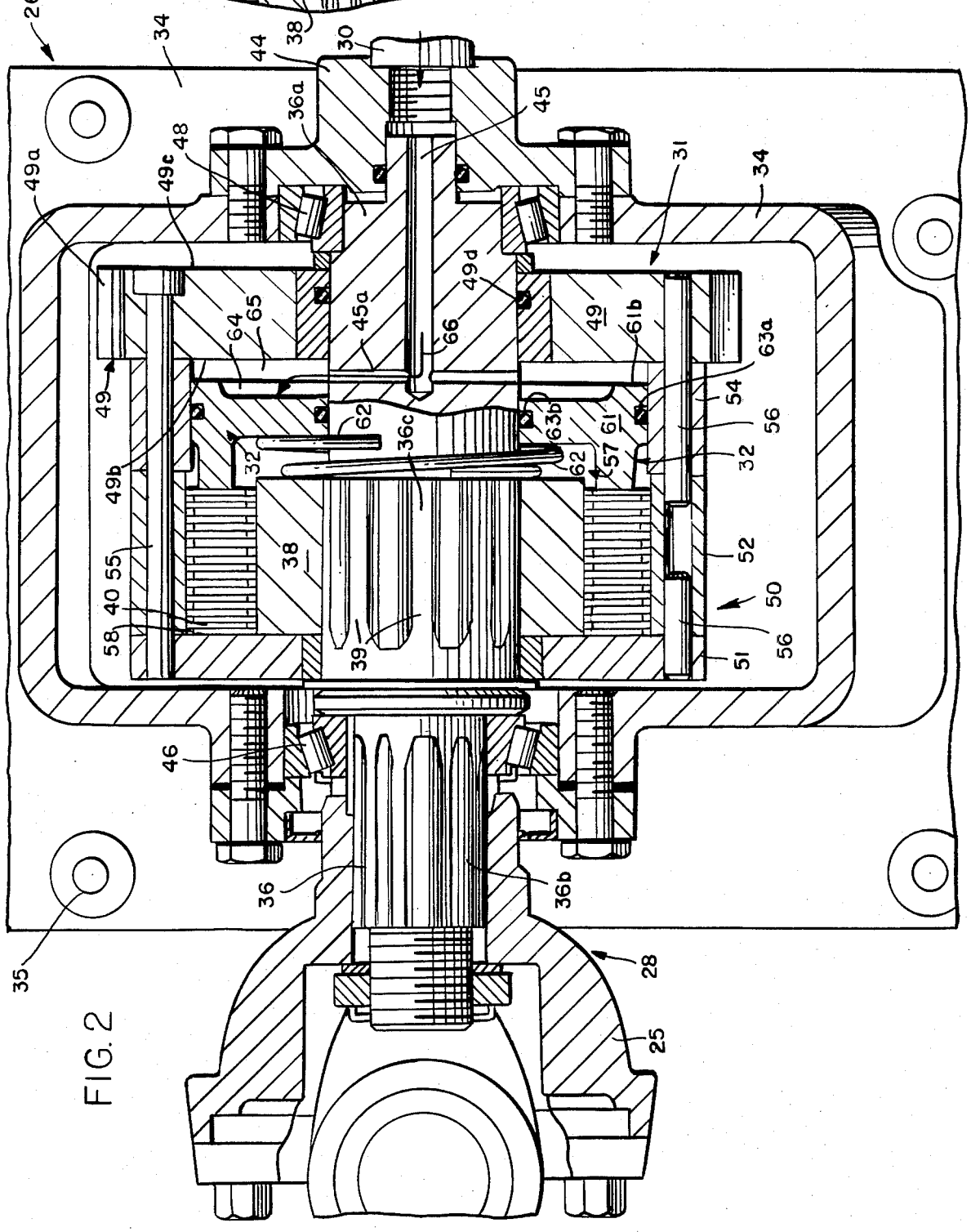
FIG. 2 is a vertical cross-sectional view of an illustrative clutch assembly incorporating the invention, with the clutch shown in engaged position.

Thus, when the vehicle operator shifts the clutch into engagement, the piston 61 need traverse only a tiny fraction of an inch in order to engage the innermost separator plate 40c and begin clutching action of the sandwiched plates 40, 58. These plates 40, 58 in turn are virtually instantly snapped together, like dominoes, into rotary unison by reason of the extremely small separation between plates. The progression of engagement of the clutch piston 61 and plates 40, 58 is as follows. The piston 61 moves, being urged by fluid pressure exerted in the chamber 65 (see direction of fluid flow 66), from right to left as viewed in FIGS. 2 and 3 (i.e. outwardly along the output shaft 36), squeezing oil from the intervening space between the piston and the innermost separator plate 40c. After the piston-face 61a touches plate 40c, that plate begins moving to its left, squeezing oil from between it and the adjacent plate 58. A domino effect then results with continued piston movement, as each successive plate 40 or 58 is moved to its left, squeezing oil from between the plates and thereby transmitting force from the piston to the pack of plates 40, 58. The pack of plates 40, 58 locks up as soon as the piston has moved sufficiently to compact the plates into an integral mass, which occurs almost instantly.

By utilizing the clutch assembly of the invention, I find that extremely high clutch torque capacity may be attained. For example, a clutch torque capacity of approximately 1,900 foot-pounds is readily attainable using my invention even though a minimum clutch size is employed. For example, the illustrative clutch casing 34 body is only 5½ inches wide, 8¾ inches long, and 7 inches high on the outside. To accomplish this goal, I find it particularly advantageous to utilize clutch plates 40, 58 having as in this instance a minimum radius of gyration of only about 2 inches.

I have provided and described herein a direct locking clutch assembly that remains engaged at the control of a vehicle operator, thus delivering maximum tractive efficiency for example in agricultural applications. With the clutch assembly of the invention engaged, should a normally driven vehicle wheel encounter a soft spot on the ground, the auxiliary driven wheels will maintain the forward motion of the vehicle thus avoiding any loss of effective traction. This arrangement is particularly advantageous since a vehicle wheel develops its maximum tractive efficiency just prior to slipping. My clutch assembly thus desirably avoids a situation in which the normally driven wheels of the vehicle experience slip prior to engagement of the clutch, which would result in loss of maximum tractive efficiency.

One of the ancillary features of the invention is that the maximum extent of travel of the piston 61 may be limited as desired, so that when a predetermined portion of the available thickness of material making up the friction surface 58c has been worn away, e.g. about one-half, the piston will bottom out thus preventing further wear of the friction material which could lead to destruction of the clutch assembly. This piston travel limitation may be predetermined by selecting suitable lateral dimensions for the piston 61 as well as for the pack of clutch plates 40, 58 and the spring 62.

One of the further advantageous features of the invention is that the illustrative clutch assembly may be employed in a vehicle which moves in both forward and backward directions. In other words, the clutch assembly of the invention is equally useful when the clutch is locked up with the clutch output shaft assembly turning in either clockwise or counterclockwise direction.

I claim as my invention:

1. For transmitting power from the transmission of a two-wheel drive vehicle to an auxiliary drive axle for the vehicle to thereby convert the vehicle to a four-wheel drive vehicle, a clutch assembly comprising, in combination, a clutch casing mounted on the vehicle; an output shaft assembly having an output shaft and means for rotatably mounting the shaft in said clutch casing, a hub secured to a mid-portion of the output shaft, a plurality of axially spaced, annular separator plates extending outwardly from and slidably secured along their inner periphery directly to the output shaft hub without any intervening element therebetween, said separator plates being rotatable with the output shaft hub and axially slidable with respect thereto; means for drivingly connecting one end of the output shaft to the auxiliary two-wheel drive axle for the vehicle; a drive gear assembly including a drive gear disposed within said clutch casing and rotatably mounted on the other end of said output shaft, said drive gear having inner and outer faces, an axially disposed outer carrier member rotatably secured to the drive gear, a plurality of axially spaced, annular friction plates extending inwardly from and slidably secured along their outer periphery directly to the outer carrier member without any intervening element therebetween, said friction plates being rotatable with the drive gear and axially slidable with respect to said hub; said annular friction plates of the drive gear assembly being interposed between said annular separator plates of the output shaft assembly so that lateral motion of said respective plates toward one another causes clutching action of the drive gear and output shaft; means for drivingly connecting said drive gear through its gear teeth to the vehicle transmission; and coupling means for drivingly connecting said drive gear assembly to said output shaft assembly, said coupling means including an annular piston rotatably disposed within a piston housing and rotatably mounted on said output shaft and interposed between said drive gear and said output shaft hub, said piston having inner and outer faces and being laterally movable along the output shaft, said outer piston face being annular in shape and defining therewithin a cup-shaped recess and disposed to directly engage the innermost one of said separator plates carried by the output shaft assembly when the clutch is actuated without any intervening element therebetween for obstructing immediate lockup of said piston face and separator plate, coil spring means for normally maintaining the piston disengaged from said innermost separator plate and thus in a disengaged position of the clutch, said coil spring means surrounding said output shaft and disposed within said cup-shaped recess and interposed between the piston and said output shaft hub without any intervening element therebetween, said inner piston face cooperating with said outer face of said drive gear to define therebetween a chamber for hydraulic fluid, and means for applying hydraulic fluid under pressure within said chamber to overcome the bias of said coil spring means for moving said piston laterally so that its outer face engages said innermost one of the separator plates to thereby compress said separator and friction plates together to actuate and thereby bring about immediate lockup of the clutch.

2. A clutch assembly as defined in claim 1, in which the number of separator plates is about ten, and the number of friction plates is about ten.

3. A clutch assembly as defined in claim 2, in which the separator plates and friction plates each have a minimum radius of gyration of only about two inches.

4. A clutch assembly as defined in claim 1, in which the separator plates and friction plates each have a minimum radius of gyration of only about two inches.

5. A clutch assembly as defined in claim 1, in which a plurality of friction plates and separator plates are employed and are separated from each other by only a minor fraction of an inch when the clutch is disengaged.

6. A clutch assembly as defined in claim 5, in which the minor fraction of an inch is only about 0.01 inch.

7. A clutch assembly as defined in claim 1, in which the maximum extent of travel of the piston may be limited as desired, so that when a predetermined portion of the available thickness of material making up the friction surface has been worn away, the piston will bottom out thus preventing further wear of the friction material.

* * * * *